United States Patent
Axelsson

(10) Patent No.: US 8,342,124 B2
(45) Date of Patent: Jan. 1, 2013

(54) APPARATUS AND METHOD FOR CLEANING A MILKING SYSTEM

(75) Inventor: Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 295 days.

(21) Appl. No.: 12/739,423

(22) PCT Filed: Nov. 17, 2008

(86) PCT No.: PCT/GB2008/003857
§ 371 (c)(1),
(2), (4) Date: Apr. 23, 2010

(87) PCT Pub. No.: WO2009/063227
PCT Pub. Date: May 22, 2009

(65) Prior Publication Data
US 2010/0300490 A1 Dec. 2, 2010

(30) Foreign Application Priority Data

Nov. 16, 2007 (EP) .................................. 07254499

(51) Int. Cl.
*A01J 5/017* (2006.01)
(52) U.S. Cl. .................................................. 119/14.02
(58) Field of Classification Search ............... 119/14.02, 119/14.01, 14.03, 14.04, 14.09
See application file for complete search history.

(56) References Cited

U.S. PATENT DOCUMENTS

| | | | | |
|---|---|---|---|---|
| 5,913,281 A | * | 6/1999 | van den Berg | 119/14.18 |
| 7,143,718 B2 | * | 12/2006 | Bosma et al. | 119/14.02 |
| 8,109,233 B2 | * | 2/2012 | Markusson | 119/14.02 |
| 2005/0211173 A1 | * | 9/2005 | Fransen et al. | 119/14.02 |
| 2008/0202431 A1 | * | 8/2008 | Obermuller et al. | 119/14.03 |

FOREIGN PATENT DOCUMENTS

| | | |
|---|---|---|
| EP | 0 689 762 | 1/1996 |
| EP | 0 990 387 | 4/2000 |
| EP | 1 169 913 | 1/2002 |
| WO | 90/07268 | 7/1990 |
| WO | 96/01041 | 1/1996 |
| WO | 00/72665 | 12/2000 |
| WO | 03/077645 | 9/2003 |

OTHER PUBLICATIONS

International Search Report dated Mar. 3, 2009, from corresponding PCT application.

* cited by examiner

*Primary Examiner* — Kristen C Hayes
(74) *Attorney, Agent, or Firm* — Young & Thompson

(57) ABSTRACT

A system and method of cleaning a plurality of teat cups (8*a-d*) includes using a robotic manipulation device (2) to move the plurality of teat cups (8*a-d*) from a first position to a second position, and cleaning the teat cups (8*a-d*) at a second position, wherein the robotic manipulation device (2) deposits the teat cups (8*a-d*) individually, in turn, at the second position.

8 Claims, 5 Drawing Sheets

APPARATUS AND METHOD FOR CLEANING A MILKING SYSTEM

The present invention relates to an apparatus and method for cleaning a milking system and particularly, but not exclusively, to an apparatus and method for cleaning a milking system associated with a rotary milking parlour.

The present invention can be utilised in various types of milking parlour known in the dairy industry. One of these arrangements is of particular use in handling a large number of animals and is often referred to as the rotary parlour. This type of parlour is provided with a comparatively large number of milking stalls arranged in a circular configuration on a rotating annular platform. The platform rotates at a relatively low constant speed so that a cow may readily step onto the platform from a stationary holding bay and thereby gain access to a stall. If necessary, the rotary movement of the platform may be stopped momentarily in order to allow a cow sufficient time to enter (or exit) the platform. The continued rotation of the platform then moves the stall into a position where an operator can perform certain tasks (such as teat cleaning and placement of teat cups on the teats) so as to allow the milking process to begin. The speed of rotation is such that the milking process will have been completed by the time a stall has moved from the cow entry position (where a cow gains entry onto the platform) to a cow exit position (where a cow is permitted to leave the platform). The cow entry and exit points are adjacent one another so as to maximise the time a cow spends in the milking stall.

It will be understood that cows may constantly enter and exit a rotary parlour without necessarily stopping the platform rotation and this allows for a large number of cows to be handled. It will be also understood that the movement of the platform results in cows being brought to an operator in turn. The operator is therefore able to remain in one location and concentrate on essential milking tasks without interruptions.

There are two main types of rotary milking parlour system, which may be referred to as the Parallel Rotary system and the Herringbone Rotary system.

In a Herringbone Rotary system, a cow stands in a stall facing diagonally towards the outside of an annular rotating platform, in the general direction of rotation. One or more operators stand on the inside of the rotating platform and are thereby provided good access to the side of each cow. Milking equipment is positioned alongside each cow on the inside edge of the platform.

In a Parallel Rotary system, a cow stands in a stall of a rotating platform so as to face radially inward towards the centre of rotation of the platform. Operators stood outside the rotating platform are then able to work from the rear of each cow as the cow passes in turn. Because the cows are positioned side by side, the parallel rotary system allows more cows to be accommodated in the same space.

In each of these types of rotary parlour, each milking stall is provided with a cluster of four teat cups. These teat cups are attached to the teats of a cow located within the stall so as to allow said cow to be milked. Once the milking process has been completed, an automatic retraction system is typically used to remove the four teat cups simultaneously from the teats. Such a system comprises a cord which is attached to the teat cup cluster and which is retracted automatically at an appropriate time so as to pull the teat cup cluster from the cow. The teat cups may then be dragged through a stationary pool of cleaning fluid as the rotary platform rotates, or an operator may place each teat cup manually on a wash candle/nozzle. The teat cups may be thereby rinsed before being attached to the next cow to be milked.

Once a milking session has been completed and the cows have vacated the platform, the milking system as whole (i.e. the teat cups and associated hoses for all the milking stalls, and the pumping system) is washed (i.e. flushed through) with a cleaning fluid. Since the teat cups of a rotary parlour are all interlinked (i.e. in fluid communication with one another), each teat cup must be placed in sealing engagement with a wash nozzle (which supplies cleaning fluid under pressure) so as to form a closed circuit before the full system wash may commence. This process of placing each teat cup on a wash candle is completed manually for the entire rotary parlour and is both labour intensive and time consuming.

A prior art implement for milking cows is disclosed in EP 0 990 387 wherein a robotic arm is used to carry a teat cup cluster, so that the cups of this cluster can be automatically connected to the teats of an animal. A cleaning member is provided for cleaning the teat cups, comprising a plate with four recesses into which the teat cups are inserted. The robotic arm is also used to bring the teat cups, contemporaneously with one another as a cluster, to a position adjacent the cleaning implement for the purposes of cleaning the teat cups.

A first aspect of the present invention provides a method as recited in the appended independent claim 1.

A second aspect of the present invention provides apparatus as recited in the appended independent claim 13.

Further advantageous optional features of the invention are set out in the appended dependent claims.

Described hereinafter is a method of cleaning a plurality of teat cups, the method comprising the steps of using a robotic manipulation implement to move the plurality of teat cups from a first position to a second position, and cleaning the teat cups at the second position; characterised in that the robotic manipulation device deposits the teat cups individually, in turn, at the second position.

Each teat cup may be moved from the first position to the second position individually. Alternatively, each teat cup may be moved from the first position to the second position simultaneously with at least one other of the teat cups. Whilst the teat cups may be moved simultaneously to the second position with other teat cups, they may nevertheless be deposited individually at the second position. It is preferable for each teat cup to be received by a teat cup magazine when in the first position.

Described hereinafter is apparatus for milking animals comprising: a robotic manipulation device adapted to manipulate teat cups and by means of which teat cups are connected to the teats of an animal and are moved to a cleaning position, characterised in that the robotic manipulation device is operable to deposit the teat cups individually, in turn, at the cleaning position.

The robotic manipulation device is ideally operable to move two or more teat cups simultaneously to the cleaning position. Also, the apparatus may comprise a teat cup magazine from which a teat cup is moved to the cleaning position.

The present invention provides the advantage over the prior art of allowing a milking parlour to be quickly and conveniently configured for a full system wash, particularly where the milking parlour is of a type having multiple milking stalls and very large numbers of teat cups attached individually to the teats of a cow (such as in a rotary milking parlour).

An embodiment of the present invention will now be described with reference to the accompanying drawing, in which.

Figure 1:
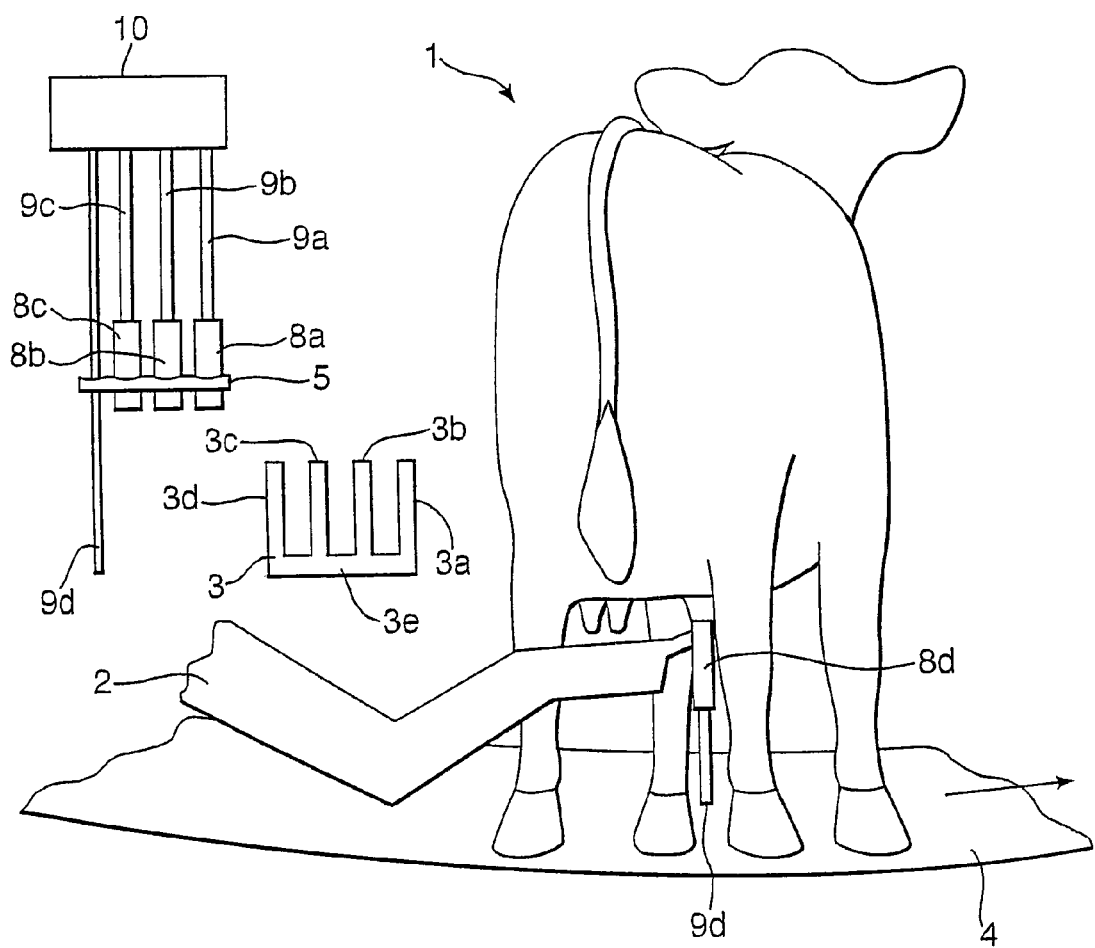
FIG. 1 is a schematic perspective view of apparatus according to the present invention wherein a teat cup is being attached to a teat by means of a robotic arm.
Figure 2:
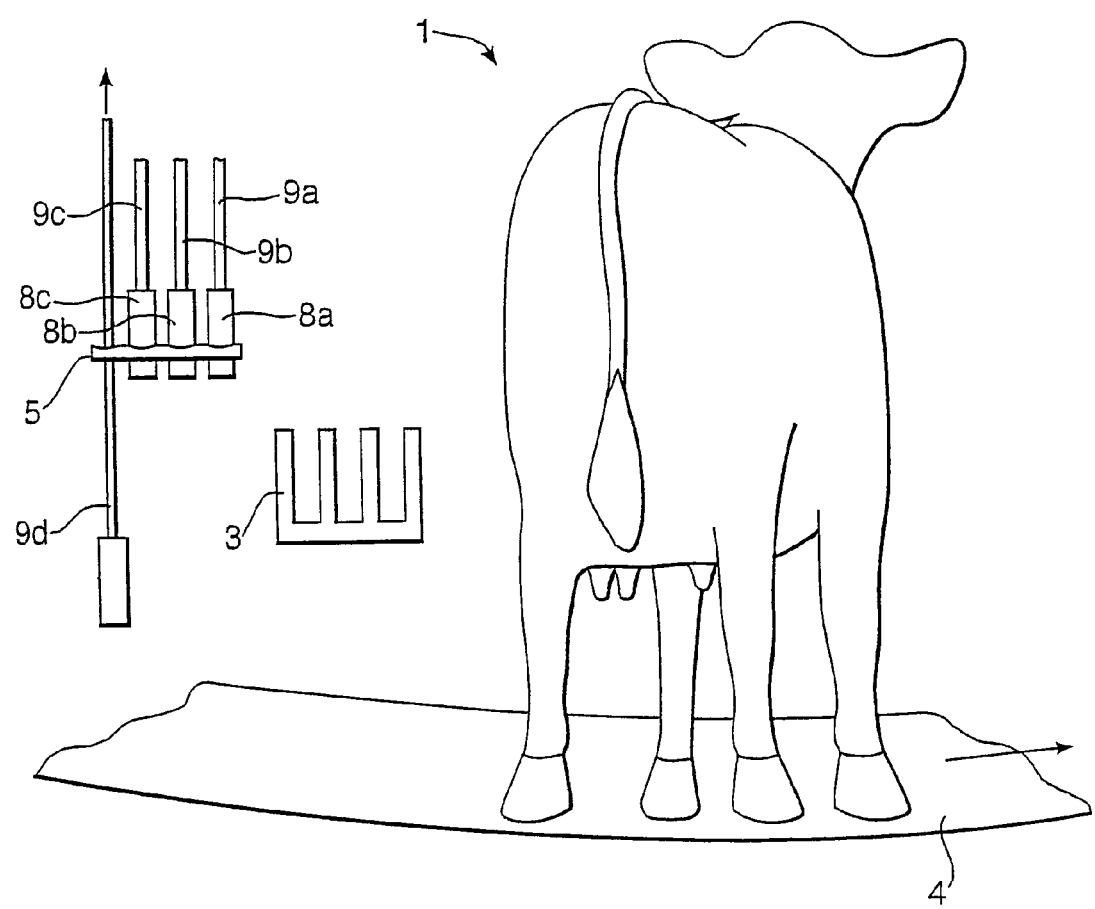
FIG. 2 is a schematic perspective view of the apparatus of FIG. 1 wherein a teat cup is being automatically retracted into a teat cup magazine.
Figure 3:
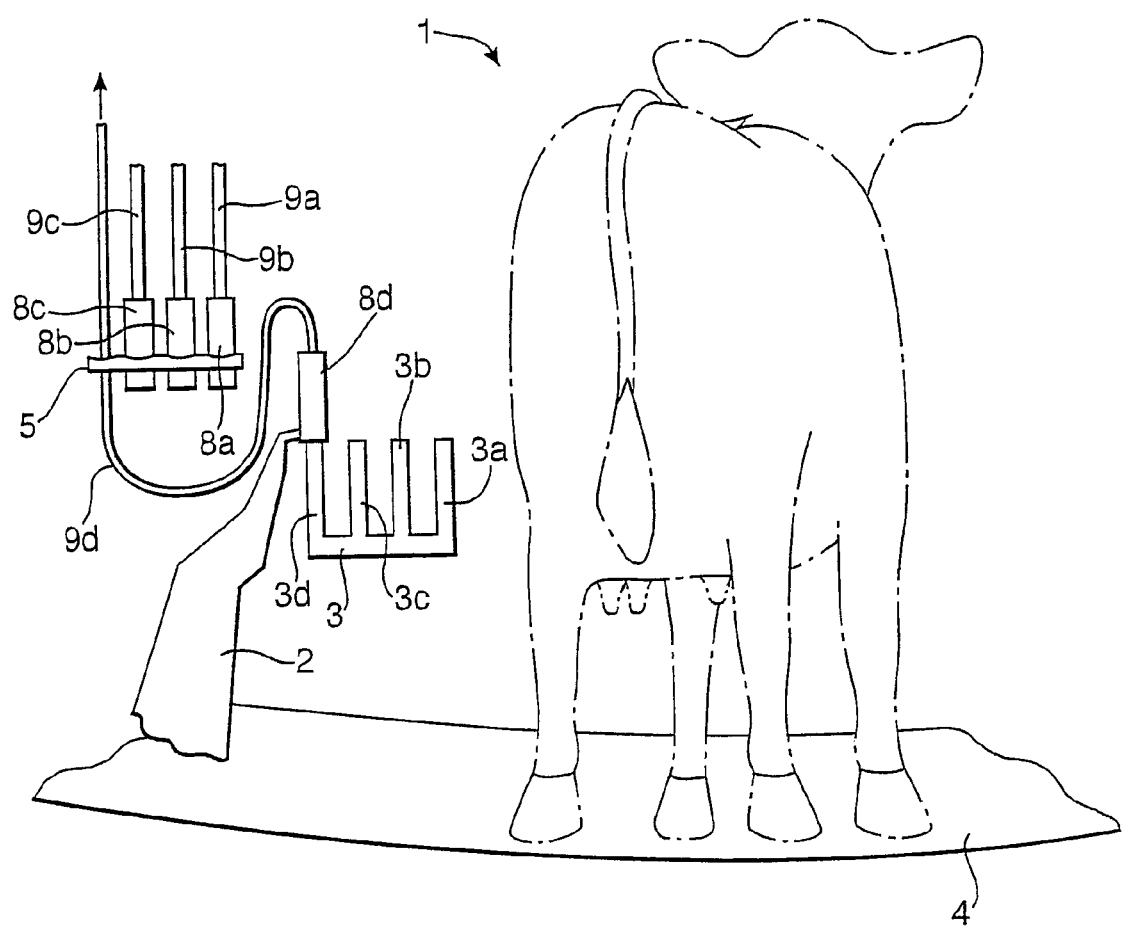
FIG. 3 is a schematic perspective view of the apparatus of FIG. 1 wherein a teat cup is being moved from a teat cup magazine to a wash nozzle in accordance with the present invention.
Figure 4:
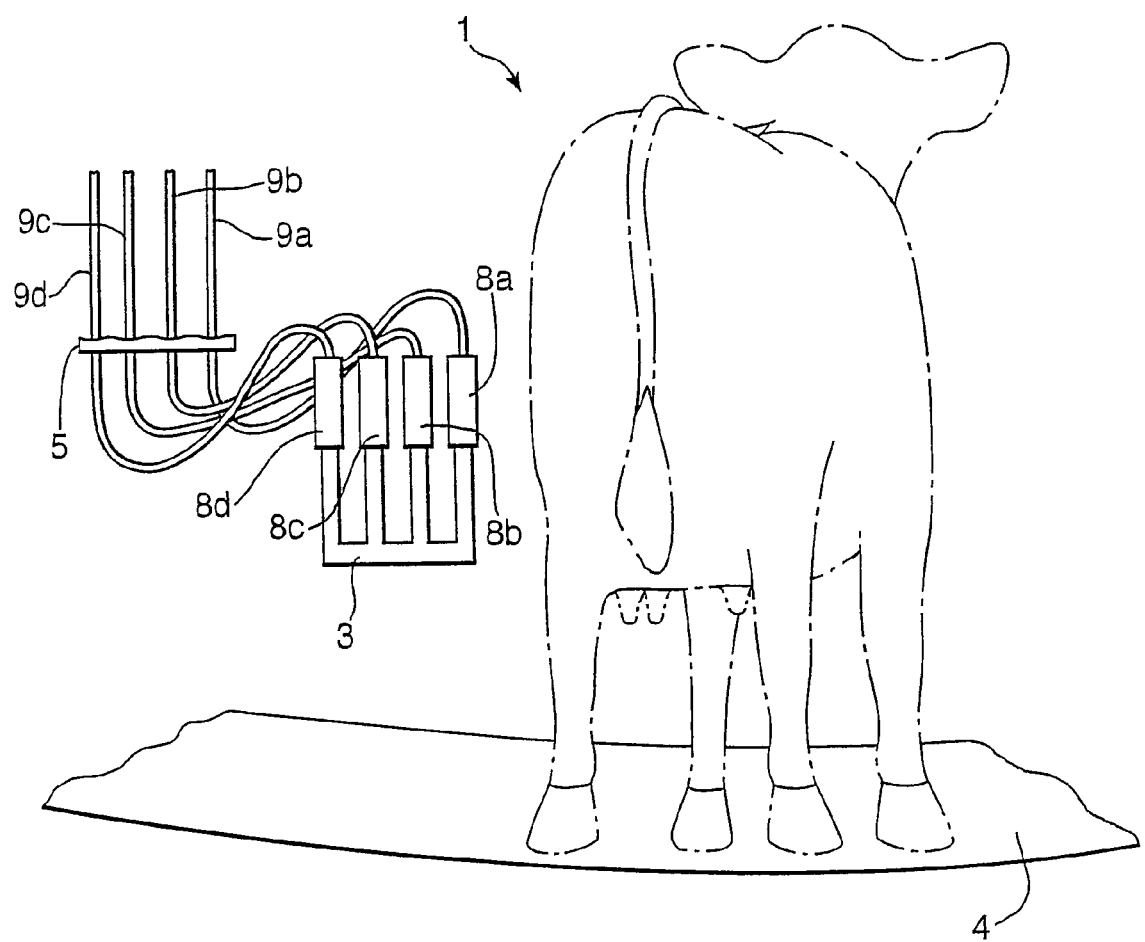
FIG. 4 is a schematic perspective view of the apparatus of FIG. 1 wherein all teat cups of the apparatus have been moved to respective wash nozzles by a robotic arm so that the apparatus may undergo a system wash.

A milking stall of a parallel rotary milking parlour is schematically shown in FIGS. 1 to 4 of the accompanying drawings. The milking stall is one of a number of identical milking stalls located side-by-side on a rotating platform 4. FIGS. 1 and 2 show a cow 1 stood on the rotating platform 4 in the milking stall. FIGS. 3 and 4 show, in phantom, the original position of the cow 1 after the milking process has been completed and the cow 1 has left the milking stall.

Each milking stall on the rotating platform 4 is provided with four teat cups 8a, 8b, 8c, 8d for attachment to the teats of a cow 1; a teat cup magazine 5 for receiving the teat cups 8a, 8b, 8c, 8d when not in use; and a cleaning implement 3 having four wash nozzles 3a, 3b, 3c, 3d for receiving the teat cups 8a, 8b, 8c, 8d during a general cleaning of the milking system.

Each teat cup 8a, 8b, 8c, 8d is connected to a vacuum system in a conventional manner by means of separate hoses 9a, 9b, 9c, 9d and is thereby able to extract milk from a teat. The use of separate hoses allows the teat cups 8a, 8b, 8c, 8d to be moved separately to, and independently of, one another.

The teat cup magazine 5 is provided with four apertures in which the four teat cups 8a, 8b, 8c, 8d may be located when not attached to the teats of a cow 1 or received by the wash nozzles 3a, 3b, 3c, 3d of the cleaning implement 3. The use of the magazine 5 assists in storing the teat cups 8a, 8b, 8c, 8d in an organised fashion and ensures their storage location is known so as to assist in their automatic movement to a teat or wash nozzle. Each hose 9a, 9b, 9c, 9d passes through a different one of the four magazine apertures when the teat cups 8a, 8b, 8c, 8d are pulled from the magazine 5. Accordingly, when the hoses 9a, 9b, 9c, 9d are pulled back through the apertures by an automatic teat cup retraction system 10 (shown in FIG. 1 only), each teat cup 8a, 8b, 8c, 8d is guided back to the magazine 5 and into its respective aperture.

The cleaning implement 3 (shown schematically in the drawings) is provided for receiving the teat cups 8a, 8b, 8c, 8d after they have been used for milking. The cleaning implement 3 is provided with four wash nozzles (or wash candles) 3a, 3b, 3c, 3d arranged in a linear array along a common manifold 3e. A cleaning fluid supply hose (not shown) is connected to the manifold 3e for supplying cleaning fluid to each nozzle 3a, 3b, 3c, 3d.

It will be appreciated that, although the wash nozzles 3a, 3b, 3c, 3d are shown in the drawings pointing vertically upwards, any convenient orientation of the nozzles could be used. For example, the nozzles may be arranged so as to point vertically downwards or horizontally.

A robotic manipulation device comprising a robotic arm 2 is also provided for servicing a milking stall. The robotic manipulation device is located adjacent the rotating platform 4, rather than in a milking stall itself, so as to be capable of servicing each stall of the rotary parlour as each stall passes in turn. It will be understood therefore that only a single robotic manipulation device is required for the entire rotary parlour. Nevertheless, one or more further robotic manipulation devices may be provided if deemed necessary.

The robotic arm 2 of the manipulation device is adapted to grasp one of the teat cups 8a, 8b, 8c, 8d and then move it from one location to another before the teat cup 8a, 8b, 8c, 8d is released. By means of the robotic arm 2, the teat cups 8a, 8b, 8c, 8d can be moved, in turn, to the cleaning implement 3. Specifically, the robotic arm 2 is adapted to move the teat cups 8a, 8b, 8c, 8d to a position adjacent to, or engaging with, the wash nozzles 3a, 3b, 3c, 3d one after another in a predefined sequence. In particular, this involves moving a first teat cup 8a to a first wash nozzle 3a and then moving each subsequent teat cup 8b, 8c, 8d to a respective wash nozzle 3b, 3c, 3d adjacent the nozzle previously engaged with a teat cup.

During use of the rotary milking parlour shown in FIGS. 1 to 4, it will be understood that the rotating platform 4 moves an empty milking stall into a position in which the stall may be accessed by a cow 1 to be milked. If necessary, the platform 4 may be momentarily stopped in order to allow the cow 1 to more readily access the stall.

Once the cow 1 is positioned in the stall, the robotic arm grasps the teat cups 8a, 8b, 8c, 8d one by one and individually moves the teat cups from the magazine 5 to the teats of the cow 1. In this way, all four teat cups 8a, 8b, 8c, 8d are attached to the teats of the cow 1 by the robotic arm 2 before the cow 1 moves beyond the reach of the robotic arm 2 (see FIG. 1).

As will be understood by those skilled in the art, the robotic arm 2 attaches the teat cups 8a, 8b, 8c, 8d to the teats in an entirely automatic fashion. A conventional arrangement of detectors/sensors may be used for determining the location of the teats so that the robotic arm 2 may place each teat cup 8a, 8b, 8c, 8d, correctly. The milking operation is then begun and is monitored by various sensors (for example, a milk meter, conductivity sensors, and temperature sensors). Finally, once it is detected that the milking operation has been completed, the teat cups are automatically detached from the teats by means of the automatic teat cup retraction system 10. This retraction system 10 pulls the hoses 9a, 9b, 9c, 9d attached to the teat cups 8a, 8b, 8c, 8d back through the teat cup magazine 5 and thereby pulls the teat cups 8a, 8b, 8c, 8d from the teats. Upon further retraction of the hoses, 9a, 9b, 9c, 9d, the teat cups 8a, 8b, 8c, 8d are pulled back into a known storage position within the teat cup magazine 5 where they may be again readily located by the robotic arm 2 for subsequent manipulation. It will be appreciated that the platform 4 meanwhile continues to rotate (see FIG. 2).

Once the milking process has been completed and the teat cups 8a, 8b, 8c, 8d have been detached from the teats, the cow 1 may leave the rotating platform 4 at a suitable exit point. The stall then becomes vacated and available to receive a further cow.

Once a milking session has been completed and no further cows are to be milked, it is often desirable to undertake a system wash whereby all teat cups and associated hoses and pumping systems for the rotary milking parlour as a whole are flushed through with an appropriate cleaning fluid. In the milking parlour shown in FIGS. 1 to 4 of the accompanying drawings, cleaning fluid enters the milking system at each teat cup of the system (i.e. at each teat cup in every stall of the parlour) by means of the cleaning implement 3 located in each stall. More specifically, each teat cup, 8a, 8b, 8c, 8d is located in sealing engagement with a respective wash candle 3a, 3b, 3c, 3d so as to form a closed circuit between the milking system (which, in ordinary use, receives milk) and a wash system (which provides cleaning fluid, rather than milk, to the teat cups). As will be understood from FIG. 3 of the accompanying drawings, the robotic arm 2 is used to move the teat cups 8a, 8b, 8c, 8d in turn from the teat cup magazine 5 to respective wash nozzles 3a, 3b, 3c, 3d of the cleaning implement 3. The robotic arm 2 thereby sealingly engages each teat cup of a milking stall with the cleaning implement 3 of that stall. Furthermore, it will be understood that the robotic arm 2 moves the teat cups of each stall in this way as each stall passes the robotic arm 2. It is emphasised that the same robotic arm 2 which attaches the teat cups to the teats of a cow is used to attach the teat cups to the cleaning implement 3.

Once the teat cups 8a, 8b, 8c, 8d of each stall of the rotary milking parlour are sealingly engaged with their respective wash nozzles (as shown in FIG. 4) cleaning fluid may be supplied to the wash nozzles and drawn through the milking system. In this way, the milking system is cleaned.

Once the full system wash has been completed, the teat cups 8a, 8b, 8c, 8d are removed from the cleaning implement 3 through operation of the automatic teat cup retraction system 10. Accordingly, it will be appreciated that the teat cups 8a, 8b, 8c, 8d are detached from the wash nozzles 3a, 3b, 3c, 3d in the same way that they are detached from the teats of a cow 1. The teat cups 8a, 8b, 8c, 8d are then returned to their known storage position in the teat cup magazine 5 by the retraction system 10.

Figure 5:
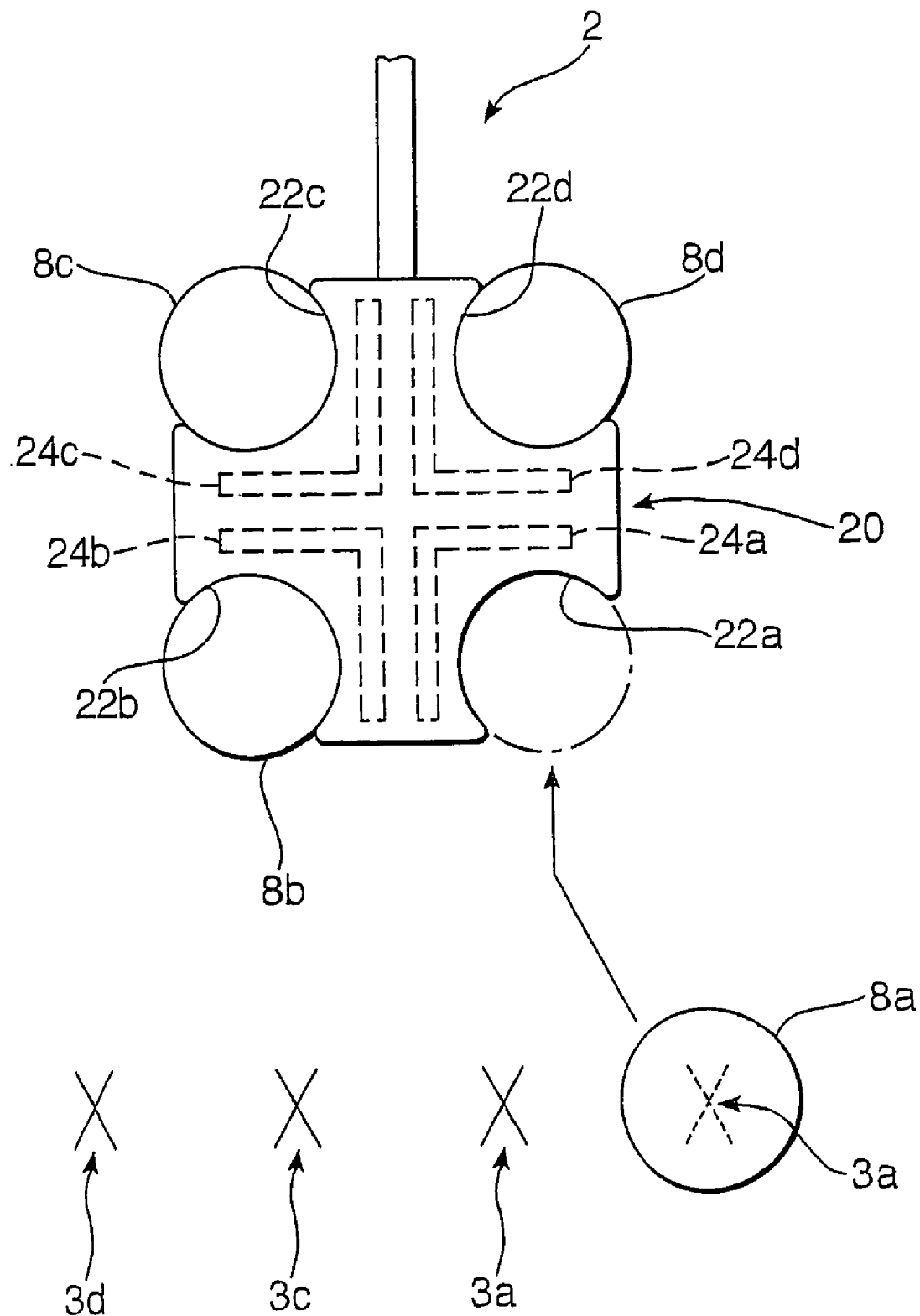
FIG. 5 is a schematic plan view of a teat cup carrying element.

In an alternative embodiment, the robotic arm is provided with means for carrying two or more teat cups simultaneously. In the embodiment shown in FIG. 5 of the accompanying drawings, it will be seen that the robotic arm 2 is provided with a teat cup receiving element 20 which has a generally square plan form with a recess 22a, 22b, 22c, 22d provided at each corner thereof for receiving a teat cup 8. In the embodiment of FIG. 5, the recesses 22a, 22b, 22c, 22d of the teat cup receiving element 20 have a part-circular shape with a radius of curvature equal to the radius of an outer surface of a teat cup 8 to be received by the element 20. It will be understood that the arrangement is such that the recesses 22a, 22b, 22c, 22d of said element 20 are sized and shaped so to maximise contact between said element 20 and a teat cup 8 received in a recess 22a, 22b, 22c, 22d. In this way, a teat cup may be securely retained in a recess 22a, 22b, 22c, 22d without excessive or other undesirable movement of the teat cup relative to said element 20.

The teat cup receiving element 20 further comprises a magnetic component 24 which magnetically attracts the teat cups 8 and retains each teat cup in a recess 22a, 22b, 22c, 22d. More specifically, an electro-magnet 24a, 24b, 24c, 24d is associated with each recess 22a, 22b, 22c, 22d and may be selectively operated to generate a magnetic field. The magnetic field is of sufficient strength to retain a teat cup 8a, 8b, 8c, 8d in the recess with which the electro-magnet is associated. The electro-magnets are operable to generate a magnetic field independently of one another. In this way, the robot arm 2 may pick up a teat cup 8a, 8b, 8c, 8d by moving said element 20 into a position whereby a recess 22a, 22b, 22c, 22d locates about the teat cup. The electro-magnet associated with the recess may then be operated to magnetically attract the teat cup 8a, 8b, 8c, 8d and thereby retain the teat cup 8a, 8b, 8c, 8d within said recess. All four teat cups may be individually collected, in turn, by the robot arm 2 in this way and then moved simultaneously to the wash nozzles 3. The teat cups 8a, 8b, 8c, 8d may then be individually placed on a respective wash nozzle in turn.

Once the robot arm 2 has moved to place a teat cup 8 on a wash candle 3, the magnetic attraction of the electro-magnet 24 may then be overcome by moving the robot arm 2 in a particular way relative to the wash candle 3. For example, having moved a teat cup 8a in an axial direction into engagement with a wash nozzle 3a, the robot arm 2 may then move laterally relative to the wash nozzle 3a so that the wash nozzle 3a effectively pulls the teat cup 8a laterally from the respective recess 22a. Alternatively, the electro-magnet may be operated (turned off) so as to cancel the magnetic field. The robot arm 2 may still then be moved laterally so as to remove the recess in a lateral direction from the associated teat cup. The remaining teat cups 8b, 8c, 8d may then be individually deposited on the remaining wash nozzles 3b, 3c, 3d in the same way.

It should be understood that the robot arm 2 may be provided with a teat cup receiving element having a different number of recesses to that shown in FIG. 5. Also, it will be appreciated that means other than a magnetic component 24 may be provided for retaining a teat cup within one of said recesses. Indeed, the robot arm 2 may be provided with an entirely different device to the one shown in FIG. 5 for simultaneously transporting two or more teat cups and for depositing said teat cups individually in turn.

Furthermore, it will be appreciated that, although the robot arm 2 may be capable of simultaneously moving more than one teat cup, it may netherthless be operated so as to move teat cups individually. It will also be understood that, because the teat cups 8 are deposited from the robot arm 2 individually, it is not necessary for the teat cups 8 to be simultaneously aligned with the wash nozzles 3 with which they are to engage. Accordingly, the teat cups 8 may be carried simultaneously by the robot arm 2 in close proximity to one another (i.e. in a compact configuration) which is independent of the configuration or layout of the wash nozzles 3. In this way, four teat cups may be conveniently carried simultaneously by the robot arm 2, particularly in congested areas near a cow or other milking equipment.

The present invention is not limited to the specific embodiments described above. Alternative arrangements will be apparent to a reader skilled in the art.

The invention claimed is:

1. A method of cleaning a plurality of teat cups, the method comprising the sequential steps of:
   with a robotic manipulation device, grasping each of a plurality of teat cups, located in a rest position in a teat cup magazine and moving the grasped teat cups to teats of a cow;
   with a teat cup retraction system, returning the teat cups from the teats of the cow to the rest position in the teat cup magazine;
   with the robotic manipulation device, moving the teat cups from the teat cup magazine to a cleaning implement, and cleaning the teat cups,
   wherein the robotic manipulation device deposits the teat cups, in turn and individually, in sealing engagement on respective wash nozzles of the cleaning implement; and
   with the teat cup retraction system, returning the teat cups from the cleaning implement to the rest position within the teat cup magazine.

2. The method according to claim 1, wherein the plurality of teat cups are deposited on the respective wash nozzles of the cleaning implement individually one after another in a predefined sequence.

3. The method according to claim 1, wherein the plurality of teat cups are provided in each of a plurality of milking stalls.

4. The method according to claim 3,
   wherein the plurality of milking stalls are provided on a platform which moves relative to the robotic manipulation device so that the plurality of milking stalls pass the robotic manipulation device one after another, and wherein the robotic manipulation device moves the teat cups of each milking stall as said each milking stall passes the robotic manipulation device.

5. The method according to claim 1, wherein the robotic manipulation device moves each of the plurality of teat cups into sealing engagement with the wash nozzles so as to provide a closed hydraulic circuit along which a cleaning fluid may flow.

6. The method according to claim 5, comprising the further step of pumping a cleaning fluid along said closed hydraulic circuit.

7. The method according to claim 1, comprising the further step of retracting a hose attached to, and in fluid communication with, each said teat cup so as to pull each said teat cup from the respective wash nozzles of the cleaning implement after the cleaning step.

8. A method of cleaning a plurality of teat cups, the method comprising the sequential steps of:

with a robotic manipulation device, grasping each of a plurality of teat cups, located in a rest position in a teat cup magazine and moving the grasped teat cups to teats of a cow;

with a teat cup retraction system, returning the teat cups from the teats of the cow to the rest position in the teat cup magazine;

with the robotic manipulation device, moving the teat cups from the teat cup magazine to a cleaning implement, and cleaning the teat cups, wherein the robotic manipulation device deposits the teat cups, in turn while carrying two or more teat cups simultaneously, in sealing engagement on respective wash nozzles of the cleaning implement; and with the teat cup retraction system, returning the teat cups from the cleaning implement to the rest position within the teat cup magazine.

* * * * *